United States Patent [19]
Nelson

[11] 3,815,346
[45] June 11, 1974

[54] HARVESTER PICKUP
[75] Inventor: Leon Franklin Nelson, Moline, Ill.
[73] Assignee: Deere & Company, Moline, Ill.
[22] Filed: June 1, 1973
[21] Appl. No.: 365,988

[52] U.S. Cl. .............................. 56/364, 56/14.3
[51] Int. Cl. ......................................... A01d 89/00
[58] Field of Search ............ 56/364, 341, 343, 344, 56/14.3, 14.4, 1, DIG. 1

[56] References Cited
UNITED STATES PATENTS
2,811,004  10/1957  Borrow ............................ 56/1 X
3,280,543  10/1966  Lawrence et al. ................ 56/1
3,771,302  11/1973  Vogt ................................ 56/364

Primary Examiner—Robert Peshock
Assistant Examiner—J. N. Eskovitz

[57] ABSTRACT

A tractor-mounted forage harvester has a relatively narrow, high-speed cutterhead and crop-feeding means mounted in a housing having a narrow inlet alongside the tractor and a windrow-pickup attachment removably attached to the housing for picking up a windrowed crop from the field and delivering it through the inlet. The pickup attachment has a forward, axially transverse, rotary pickup which raises the crop from the field and delivers it rearwardly to a transverse auger, which, in turn, delivers the crop to a fore-and-aft auger that moves the crop rearwardly along a fore-and-aft passage along one side of the auger through the forage harvester inlet. A baffle is provided adjacent the rear end of the fore-and-aft auger for directing the crop under the auger and into the fore-and-aft passageway. The pickup is floatable about a transverse axis and supported on a pair of gage wheels, and vertical tension springs extend between the pickup and a tooth-type compressor above the pickup to partly counterbalance the weight of the pickup.

16 Claims, 4 Drawing Figures

HARVESTER PICKUP

BACKGROUND OF THE INVENTION

This invention relates to a windrow-pickup attachment for a harvester, and more particularly to an improved windrow-pickup attachment having particular utility on a forage harvester.

Forage harvesters conventionally are provided with different types of harvesting attachments for harvesting different types of crops. For example, row-crop attachments are provided for harvesting row crops such as corn, cutter bar attachments are provided for harvesting standing crops, and windrow-pickup attachments are provided for picking up crops that have been previously cut and left to dry in a windrow. In the latter case, the pickup attachment has conventionally included an axially transverse finger-type reel having radial fingers that engage the crop as the machine advances and deliver it rearwardly to a transverse auger. Conventionally, the augers are provided with oppositely wound flights at opposite ends so that the auger converges the crop to the center of the pickup attachment, where it is impelled rearwardly to the forage harvester inlet. The harvesting attachments are normally rigidly attached to a subframe that is vertically adjustable relative to the main frame of the forage harvester, so that the attachment is vertically adjustable about a transverse pivot on the forage harvester.

While each windrow-pickup attachments are satisfactory for conventional self-propelled or pull-type forage harvesters, they are generally unsatisfactory for smaller, tractor-mounted harvesters.

SUMMARY OF THE INVENTION

According to the present invention, there is provided an improved windrow-pickup attachment for a forage harvester. More specifically, there is provided an improved pickup attachment having particular utility for use on a relatively small tractor-mounted forage harvester.

An important feature of the invention resides in the use of a fore-and-aft auger in addition to a transverse auger on the pickup attachment, wherein the fore-and-aft auger delivers the crop rearwardly to a relatively narrow crop inlet opening on the forage harvester. Also, baffle means are provided in association with the fore-and-aft auger causing the crop to converge into a relatively narrow fore-and-aft passage on the pickup attachment that communicates with the narrow crop inlet.

Another feature of the invention resides in the configuration of the augers, and their relative locations on the pickup attachment. Also, according to the invention, the pickup attachment can be attached to a three-point hitch-mounted forage harvester with the fore-and-aft auger generally alongside the rear drive wheel of the tractor, the transverse auger extending outwardly from the fore-and-aft auger so that the forage harvester crop inlet can be disposed immediately alongside the tractor drive wheel, thereby reducing the amount of lateral overhang of the forage harvester cutter components relative to the tractor hitch.

Another important feature of the invention resides in the provision of a transverse pivot on the harvesting attachment for vertically adjustably mounting the pickup portion of the attachment relative to the remainder of the attachment, including the augers. Also, means are provided for partly counterbalancing the weight of the pickup unit.

Still another feature of the invention resides in the provision of compression bars above the pickup unit that are vertically swingable to provide better access to the harvester attachment components from the front of the machine.

DESCRIPTION OF THE PREFERRED EMBODIMENT

Figure 1:
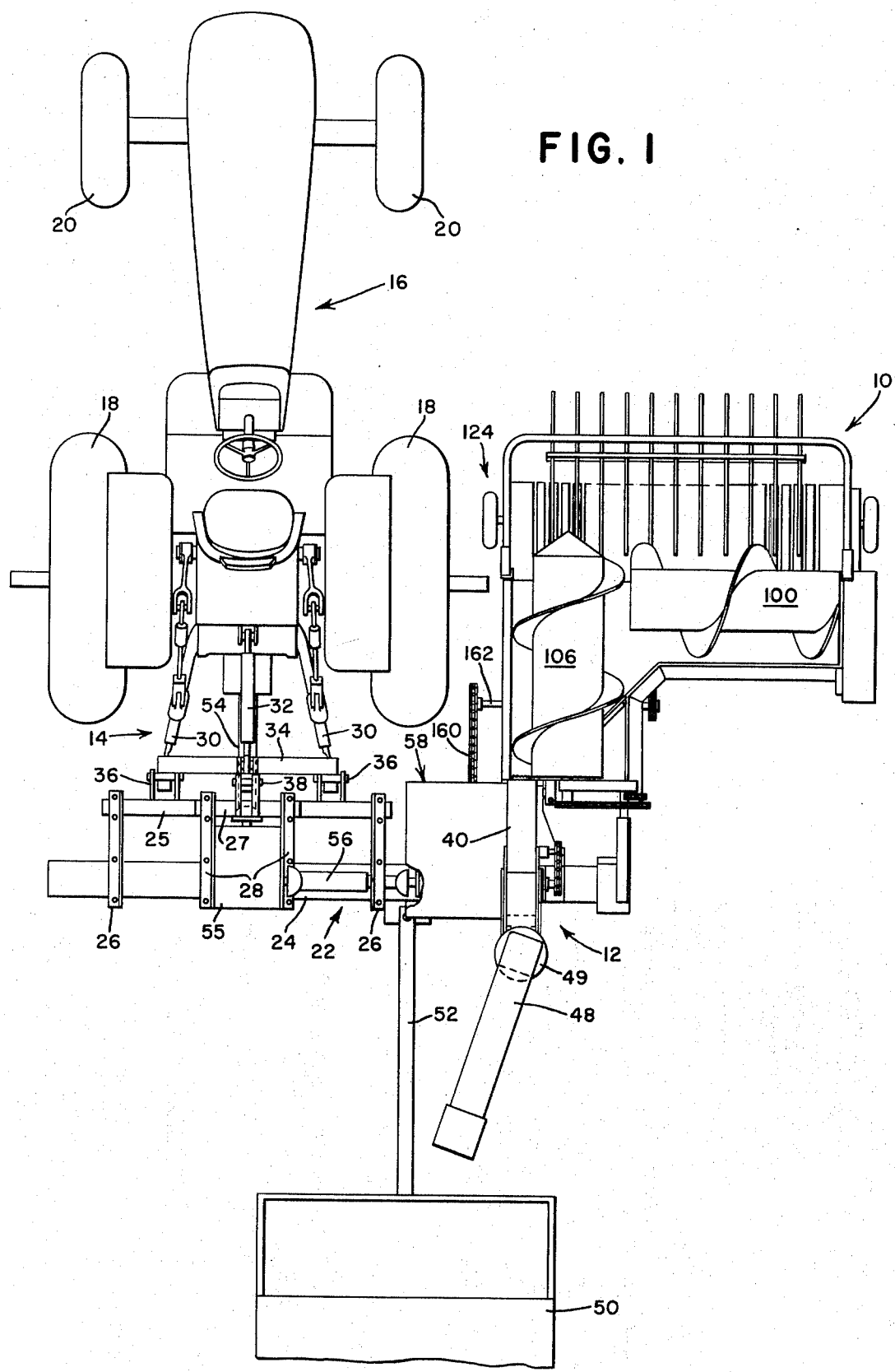
FIG. 1 is a plan view of a tractor-mounted forage harvester having a windrow-pickup attachment embodying the invention.
Figure 2:
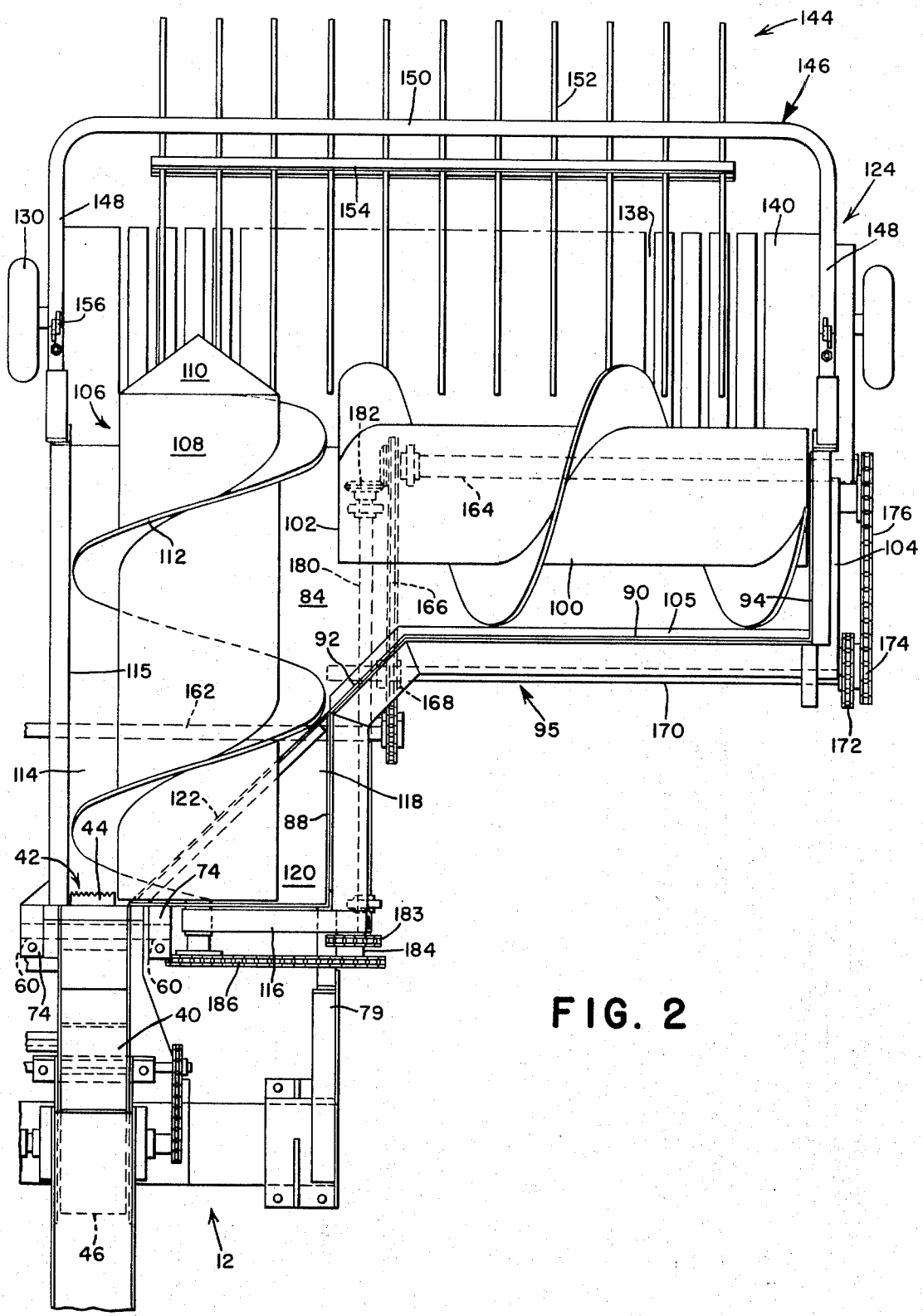
FIG. 2 is an enlarged plan view of the cutterhead portion of the forage harvester and the windrow-pickup attachment.

The invention is embodied in a windrow-pickup attachment or header, indicated generally by the numeral 10, mounted on a forage harvester, indicated generally by the numeral 12. The forage harvester 12 is mounted for vertical adjustment on a three-point hitch 14 of a tractor, indicated generally by the numeral 16. As is conventional, the tractor includes a pair of rear drive wheels 18 and steerable front wheels 20. The forage harvester has a laterally extending main frame, indicated generally by the numeral 22, that includes a transverse beam 24 spanning the width of the tractor and extending to the right therefrom. A smaller transverse beam 25 is disposed ahead of the main beam 24 and is connected thereto by a pair of fore-and-aft frame members 26. An upper transverse beam 27 is disposed above the front beam 25 and is connected to the main beam and the front beam by a pair of vertical plates 28.

As is conventional, the three-point hitch 14 includes a pair of lower links 30 and a central upper link 32, and a coupler 34 is carried by the hitch links 30 and 32 and connected to the main frame 22 at a pair of lower attachment points 36 and an upper attachment point 38 in the known manner. As is apparent, vertical adjustment of the three-point hitch 14 raises and lowers the entire main frame 22.

Mounted on the right side of the main frame 22 is a cutterhead and feed roll housing 40. As is apparent, the housing 40 is relatively narrow, being only approximately 6 inches wide in the illustrated embodiment, and has a forward inlet 42 which spans the width of the housing. As is conventional, a plurality of axially transverse feed rolls are mounted in the housing 40 and the crop moving through the inlet 42 moves between cooperating feed rolls and is fed rearwardly, only the forward portion of the upper front feed roll 44 being shown in the drawings. The feed rolls move the crop past a horizontal, transverse shear bar into a cylinder-type, axially transverse cutterhead 46, which includes a plurality of knives that register with the shear bar and sever the crop as it moves past the shear bar. The cutterhead 46 in the illustrated embodiment is only 12 inches in diameter, which is considerably less than the conventional cutterhead, and is rotated at approximately 2,400 RPM, which is considerably higher than the conventional speed. The cutterhead is also rotated in the opposite direction from the conventional direction, so that the knives move upwardly past the inlet and the shear bar and immediately impel the crop upwardly and rearwardly through a tangential outlet having an associated discharge spout 48. As is well known, the discharge spout includes a vertical swivel 49 and the rearward portion of the spout curves upwardly and rearwardly to direct the crop into a trailing wagon 50, that is connected to the transverse beam 24 by a wagon tongue 52.

The cutterhead and feed rolls are driven through a fore-and-aft PTO shaft 54 connected to the tractor PTO in the conventional manner, the rearward end of the PTO shaft 54 being connected to a bevel-type gearbox 55 that has a transverse output shaft 56, which serves as the input to a transmission 58 alongside the housing 40. Since such transmissions are well known, it is not described in detail, the transmission including one output drivingly connected to the cutterhead 46, and a second output drivingly connected to the feed rolls and operative to drive the feed rolls at different speeds to vary the feed rate of the crop material into the cutterhead.

A pair of upper, transverse members 60 extend outwardly from opposite sides of the housing 40 and a similar pair of lower, transversely extending members (not shown) extend from the opposite sides of the lower part of the housing, said four members being provided for removable attachment of the pickup attachment 10 in the known manner.

The pickup attachment or header 10 includes a frame, indicated generally by the numeral 64 and including left and right rear upright frame members 66 and 68 respectively. A third rear upright frame member 70 is disposed between the left and right members 66 and 68 and a transverse upper frame member 72 connects the upper ends of the three upright members. A pair of top clevises 74 extend rearwardly from the left frame member and the center frame member and are adapted to receive the transverse upper attachment members 60. A similar pair of bottom clevises 76 extend from the lower portion of the upright members, and are engageable by the lower attachment members, the attachment members being releasably retained in the clevises by pins 78 in the known manner, so that the pickup attachment can be easily removed by pulling the pins 78 and backing the forage harvester away from the pickup attachment. An upright brace 79 is attached to the end of the transverse beam 24 and extends forwardly and upwardly therefrom, the forward end of the brace being removably attached to the right rear upright frame member to provide additional support for the pickup attachment 10.

The pickup attachment or header has an upright rear wall 80 closing the area between the right upright frame member 68 and the center upright frame member 70, the area between the center member 70 and the left upright member 66 being open to provide a crop outlet opening 82 for the pickup attachment. The attachment has a generally horizontal, L-shaped floor 84, the fore-and-aft leg of which extends forwardly from the rear wall 80, so that the floor 84 forms the bottom of the outlet opening 82. An upright fore-and-aft left sidewall 86 extends upwardly from the left side of the floor 84, and an upright fore-and-aft sidewall 88 extends upwardly from the right side of the rearward portion of the L-shaped floor, the rearward end of the left sidewall 86 being connected to the left upright frame member 66 and the rearward end of the sidewall 88 being connected to the right rear upright frame member 68. An upright transverse rear wall 90 extends to the right from the forward end of the sidewall 88 to the right side of the attachment, and an upright approximately 45° angled wall 92 connects the rear wall 90 and the forward end of the sidewall 88. As is apparent, the rear wall 90 extends upwardly from the rearward side of the laterally extending portion of the L-shaped floor 84, and an upright fore-and-aft end wall 94 extends upwardly from the right end of the floor.

A tubular frame member, indicated generally by the numeral 95, has a fore-and-aft portion 97, connected to the right rear upright frame member 68 and extending forward along the outer side of the sidewall 88, an angled portion 98 rearwardly of the angled wall 92 and a transverse portion 99 immediately behind the rear wall 90, the frame member extending to the right end of the machine.

Figure 3:
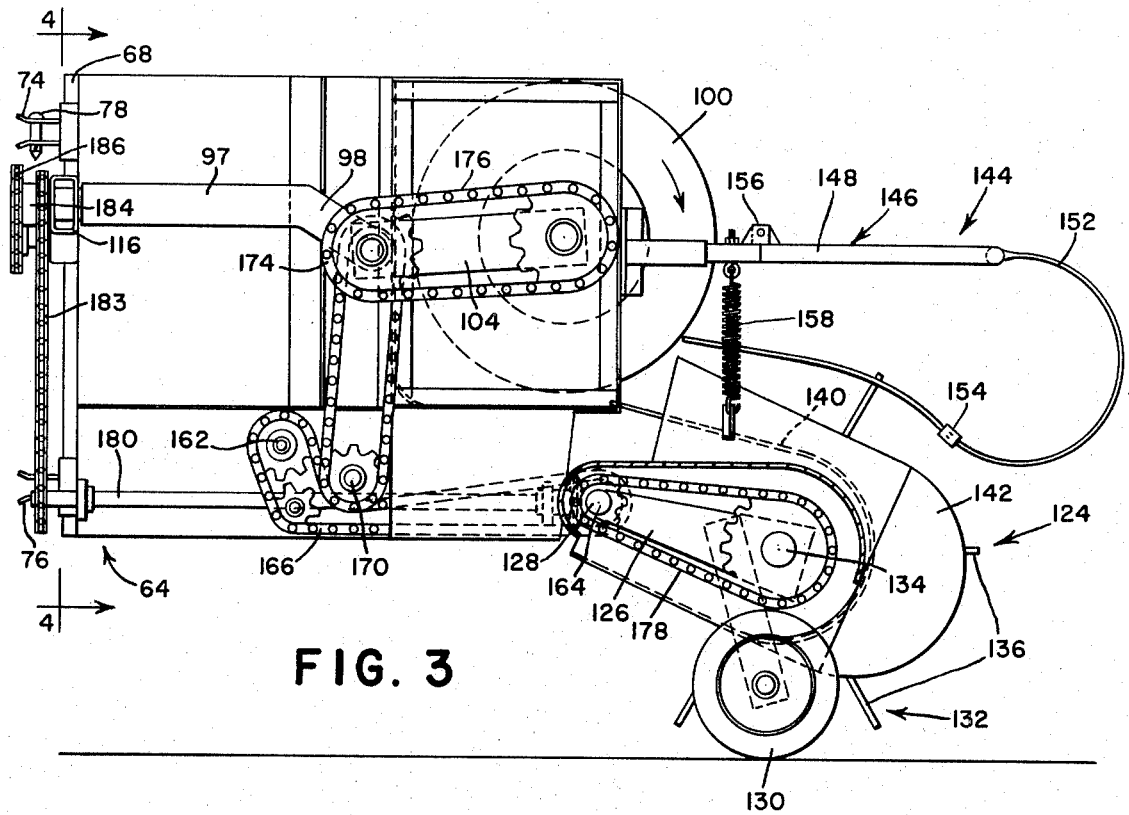
FIG. 3 is a right side elevation view of the windrow-pickup attachment.

A transverse auger 100 is disposed immediately above the floor 84 and immediately in front of the rear wall 90 and has a discharge end 102 in general fore-and-aft alignment with the sidewall 88, the auger being rotated in the direction of the arrow in FIG. 3 so that the crop moves under the auger and is moved to the left on the machine to the discharge end 102. The auger is carried in cantilever fashion on a fore-and-aft arm 104 mounted on the transverse portion 99 of the tubular frame member at the right side of the machine. A transverse stripper bar 105 is mounted on the forward side of the rear wall 90 adjacent the periphery of the transverse auger to prevent material carryover by the auger.

Figure 4:
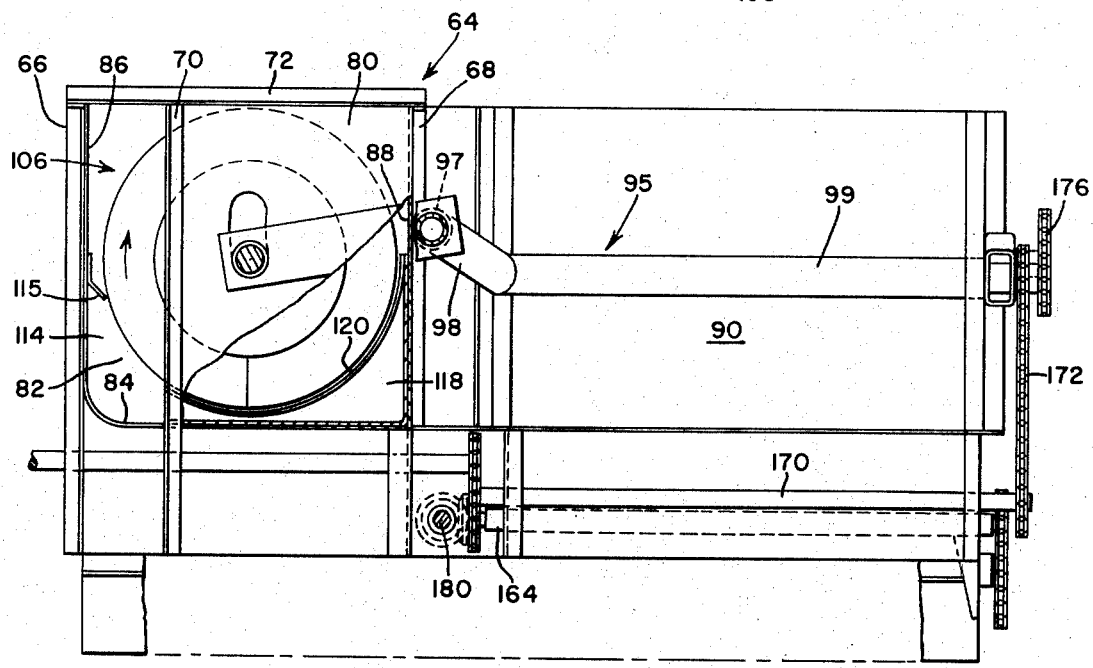
FIG. 4 is a rear view of the pickup attachment as viewed along the line 4—4 of FIG. 3 with a portion of the rear wall of the attachment broken away to show the fore-and-aft auger.

A fore-and-aft auger 106 is disposed at the left side of the machine above the floor and between the sidewalls 86 and 88, the forward end of the fore-and-aft auger being immediately adjacent the discharge end 102 of the transverse auger, while the rearward end of the fore-and-aft auger is adjacent the rear wall 80. The fore-and-aft auger 106 includes an auger tube 108, having its forward end closed by a conical cap 110, and a helical flight 112, the periphery of which is adjacent the opposite sidewalls 86 and 88. The fore-and-aft auger is rotated in the direction of the arrow in FIG. 4, so that material tends to move under the auger and between the left sidewall 86 and the auger tube, the space between the auger tube and said sidewall forming a fore-and-aft passage 114 that is aligned with the forage harvester crop inlet 42. A fore-and-aft stripper 115 is mounted on the left sidewall 86 adjacent the periphery of the auger to prevent material carryover thereby. The fore-and-aft auger is also mounted in cantilever fashion on a transverse vertically swingable arm 116 connected to the rearward end of the auger and swingably mounted on the fore-and-aft portion 97 of the tubular frame member 95. A baffle or crowder plate 118 is disposed above the floor 84 at the right rear corner thereof adjacent the sidewall 88 and the rear wall 80. The baffle has an arcuate top surface 120 conforming to and adjacent the periphery of the auger flight 112 and spanning slightly more than the lower right quadrant of the auger periphery, the top of the surface 120 being approximately at the auger center line, while the left end of the surface is adjacent the rear wall opening 82. The crowder plate 118 has an upright forward wall 122 that forms an extension of the angled wall 92, the rearward end of the upright wall being adjacent the right side of the outlet opening 82. As is apparent, the crowder plate deflects crop material moving under the auger to the left and into the fore-and-aft passage 114 and prevents a material buildup between the auger and the rearward portion of the sidewall 88 and the floor, to facilitate the feeding of the material through the opening 82.

A vertically adjustable pickup unit, indicated generally by the numeral 124, extends across the forward end of the pickup attachment 10 and includes a pickup frame 126 vertically swingable about a transverse pivot shaft 128 connecting the rear end of the pickup frame 126 and the forward end of the header frame 64. A pair of gage wheels 130 at opposite sides of the pickup unit support the pickup a predetermined distance above the ground, the pickup unit swinging vertically about the pickup shaft 128 as the gage wheels follow the contour of the ground. An axially transverse finger-type pickup rotor 132 (shown only in FIG. 3) spans the width of the pickup unit and includes a transverse shaft 134 having a plurality of radially extending pickup fingers 136 extending through slots 138 in a curved stripper deck 140, the rearward end of which abuts the forward end of the floor 84. As is apparent, the stripper deck extends generally forwardly from the floor and curves downwardly concentric with the shaft 134, the above representing more or less conventional finger-type pickup construction. As is well known, the fingers swing forwardly close to the ground and engage the windrowed crop as the machine advances, raising the crop and pushing it rearwardly along the stripper deck 140, the fingers 136 moving through the slots 138 and being stripped thereby, while the auger 100 engages the crop as soon as it is deposited on the floor 84.

The pickup unit also includes a pair of upright side panels 142 at opposite ends of the pickup unit. A crop compressor 144 is mounted on the main frame of the pickup attachment to hold crop material down on the stripper deck 140 so that it moves under the auger 100. The compressor includes a horizontal U-shaped frame 146 having a pair of fore-and-aft legs 148, with their rearward ends respectively attached to the forward ends of the sidewalls 94 and 86, and a horizontal transverse intermediate portion 150 disposed above the forward end of the pickup unit. A plurality of curved fingers 152 extends forwardly from the intermediate portion 150, curving forwardly and downwardly therefrom and then extending rearwardly generally parallel to and above the stripper deck 140, the fingers terminating adjacent the periphery of the auger 100 and being connected by a transverse bar 154 below the intermediate portion 150. The fore-and-aft legs 148 are formed by two fore-and-aft aligned sections connected by hinges 156, which permit the forward ends of the legs 148 and the fingers 152 to be swung upwardly and rearwardly to provide better access to the auger 100 in the event that the machine is plugged. As is apparent, gravity holds the swingable front portion of the compressor in its lowermost position as shown in FIG. 3, wherein the two sections of the legs 148 abut one another.

A pair of vertical tension springs 158 respectively have their upper ends connected to the fore-and-aft frame legs 148 rearwardly of the hinges 156 and their lower ends connected to the side panels 142 of the pickup unit to partly counterbalance the weight of the pickup unit.

The pickup attachment components are driven from the transmission 58, which has an output connected to a chain drive 160, which drives a main transverse drive shaft 162 on the pickup unit. A forward transverse drive shaft 164 is connected to and driven by the main drive shaft 162 by a chain drive 166, and a sprocket 168 engages the backside of the chain drive 166 to drive a third transverse shaft 170. A chain drive 172 at the right end of the drive shaft 170 connects the shaft to an intermediate double sprocket 174 coaxially disposed on the outer end of the transverse portion 99 of the tubular frame member, the sprocket 174 providing the input to a chain drive 176 that drives the transverse auger 100, the location of the double sprocket 174 on the pivot axis of the auger arm 104 accommodating the vertical adjustment of the auger.

The forward drive shaft 164 is disposed on the pivot axis for the pickup unit and the outer end of the drive shaft 164 is connected to the pickup rotor 132 by a chain drive 178, the location of the input for the drive 178 on the axis of the pivot 128 permitting the vertical adjustment of the pickup unit. The inner end of the forward drive shaft 164 drives a fore-and-aft shaft 180 through a bevel gear drive 182, and the shaft 180 serves as the input to a chain drive 183 at the rear end of the attachment, the chain drive 183 including a double sprocket 184 coaxially mounted on the fore-and-aft portion 97 of the tubular frame member. The sprocket 184 serves as the input to a chain drive 186 that drives the fore-and-aft auger 106, the location of the sprocket 184 on the pivot axis of the arm 116 again accommodating the vertical adjustment of the auger.

In operation, the pickup fingers 136 engage the crop as the machine advances and discharge it rearwardly over the stripper deck 140 onto the floor 84. Although the entire forage harvester is vertically adjustable on the tractor three-point hitch, it is normally maintained in a preselected position as the machine is operated, and the pickup unit 124 raises and lowers about the pivot 128 to follow the contour of the ground. The crop deposited on the right side of the floor is engaged by the auger 100, which is rotating in the direction of the arrow in FIG. 3, so that the crop moves under the auger and is shifted to the left to the discharge end 102, at which point it is engaged by the auger flights 112 on the fore-and-aft auger. The material picked up at the left side of the pickup is pulled directly rearwardly by the fore-and-aft auger 106, which rotates in the direction of the arrow in FIG. 4, so that the crop material moves under the auger as it is carried rearwardly. As previously described, the baffle or crowder plate 120 assists in guiding the material into the fore-and-aft passage 114. The auger discharges the material through the outlet opening 82 of the pickup attachment into the inlet opening 42 of the forage harvester 12, and the feed rolls 44 then engage the crop to move it to the cutterhead 46 as previously described.

As is apparent, the arrangement of the augers converges the crop into a relatively narrow inlet, to accommodate the narrow cutterhead. Also, the configuration of the pickup attachment 10 permits its use on the rear tractor-mounted forage harvester, since the pickup attachment extends only to the right of the forage harvester inlet and does not interfere with the tractor drive wheel 18.

I claim:

1. In a forage harvester having a mobile main frame adapted to advance over a field and having a forward crop inlet, the combination therewith of an improved harvesting header adapted to remove crop material from the field and deliver it through the inlet as the machine advances, comprising: a header frame removably attached to the main frame forwardly of the inlet and extending laterally therefrom; a pickup unit having a plurality of pickup elements adapted to raise the crop material from the field and deliver it rearwardly; a transverse auger means mounted on the header frame rearwardly of and in crop-receiving relationship to the pickup unit and adapted to move crop material laterally to its discharge end; and a fore-and-aft auger means disposed along one side of the header and having a forward intake end adjacent to and in crop-receiving relationship with the transverse auger means and a rearward discharge end adjacent to the crop inlet for moving crop material from the transverse auger means to the inlet opening.

2. The invention defined in claim 1 wherein the header frame includes a transverse pivot means and the pickup unit is swingably mounted on the pivot means for vertical adjustment about a transverse axis and includes gage wheel means at least partly supporting the weight of the pickup unit on the ground so that the pickup elements are maintained a predetermined distance above the ground.

3. The invention defined in claim 1 and including compressor means mounted on the header frame above the pickup unit and including a frame and a plurality of compressor fingers attached to the frame and disposed above the pickup unit for directing crop under the auger means, said frame means including hinge means operative to permit vertical swinging adjustment of the finger means upwardly and away from the pickup unit.

4. The invention defined in claim 1 wherein the pickup unit includes a fore-and-aft sidewall adjacent the fore-and-aft auger and a generally upright rear wall adjacent the rearward end of said auger and having an outlet opening less than 15 inches in width and adjacent the rearward end of the first sidewall in communication with the forage harvester crop inlet.

5. The invention defined in claim 1 wherein the header includes a generally horizontal floor immediately under the auger means and along which the crop is moved and also including a baffle means disposed above the floor and generally under the rearward end of the fore-and-aft auger means and including a generally upright wall extending upwardly from the floor and angled forwardly and diverging from one side of the outlet opening for crowding material moving rearwardly underneath the fore-and-aft auger means toward the outlet opening.

6. The invention defined in claim 5 and including a generally fore-and-aft stripper bar mounted on the sidewall adjacent the periphery of the upturning side of the fore-and-aft auger means.

7. The invention defined in claim 1 wherein the fore-and-aft auger means includes a generally cylindrical tube and a conical end cap mounted on and extending forwardly from the forward end of the auger tube.

8. A crop-harvesting attachment for a havesting machine comprising: a header frame removably attached to the harvesting machine; a crop pickup unit having a plurality of pickup elements adapted to raise the crop material from the field as the machine advances and deliver it rearwardly onto a generally horizontal floor mounted on the header frame; a generally upright first sidewall extending upwardly from the floor at one side of the attachment; a generally upright rear wall extending upwardly from the floor at the rear end of the attachment and having a crop outlet opening adjacent the first sidewall; a transverse auger means mounted on the attachment above the floor and adapted to receive crop material from the pickup unit and move it laterally along the floor; and a generally fore-and-aft auger means mounted on the floor in crop-receiving relationship with the transverse auger means adjacent the first sidewall and adapted to move crop material along the floor and through the crop outlet opening.

9. The invention defined in claim 8 and including a baffle means mounted above the floor and generally under the rearward end of the fore-and-aft auger means, said baffle means including a generally upright wall extending upwardly from the floor to the periphery of the auger means and diverging forwardly from the crop outlet opening.

10. The invention defined in claim 9 and including a relatively narrow fore-and-aft passage along said first wall means extending forwardly from the outlet opening, the fore-and-aft auger means moving the crop rearwardly along the fore-and-aft passage.

11. In a forage harvester having a mobile main frame adapted to advance over a field and having a forward relatively narrow crop inlet, the combination therewith of an improved harvesting header adapted to remove crop material from a field and deliver it through the inlet as the machine advances, comprising: a header frame removably attached to the main frame forwardly of the inlet; a pickup unit means adapted to raise crop material from the field and deliver it rearwardly to a generally horizontal floor; a transverse conveyor means adapted to move the crop laterally along the floor; a generally vertical first sidewall extending upwardly from the floor adjacent one side of the header; a generally vertical rear wall extending upwardly from the floor and including a relatively narrow crop outlet opening adjacent the sidewall in registry with the forage harvester inlet; a fore-and-aft auger means extending forwardly from the rear wall above the floor and adjacent the first sidewall and having a forward intake end in crop-receiving relationship with the transverse conveyor means; a drive means for rotating the fore-and-aft auger means so that the upturning side of the auger means is adjacent the first sidewall, whereby the crop moves under the auger means and along the floor toward the first sidewall and rearwardly toward the outlet opening; and a baffle means extending upwardly from the floor adjacent the auger periphery and diverging forwardly from the crop outlet opening for directing crop material moving under the auger means toward the outlet opening.

12. The invention defined in claim 11 wherein the fore-and-aft auger means includes an auger tube, the space between the auger tube and the first sidewall defining a relatively narrow fore-and-aft passage ending at the outlet opening, and including a conical end cap mounted on and extending forwardly from the forward end of the auger tube.

13. The invention defined in claim 11 wherein the transverse conveyor means includes an auger disposed behind the crop pickup means and adapted to move crop material transversely along the floor to the fore-and-aft auger means.

14. In a forage harvester having a mobile main frame adapted to advance over a field and having a forward crop inlet, the combination therewith of an improved harvesting header adapted to remove crop material from the field and deliver it through the inlet as the machine advances, comprising: a header frame rigidly and removably attachable to the main frame forwardly of the inlet and including a forward transverse pivot means; a pickup unit including a frame swingably mounted on the pivot means for vertical adjustment relative to the header frame and including a pickup rotor having a plurality of generally radially extending fingers adapted to engage the crop on the ground as the machine advances, to raise the crop, and to project it rearwardly onto a generally horizontal floor on the header frame; gage wheel means attached to the pickup unit frame for supporting the pickup rotor a predetermined distance above the ground; spring means operative between the pickup unit and the remainder of the header for partially counterbalancing the weight of the pickup unit; a transverse auger means mounted on the header above the floor in crop-receiving relationship with the pickup unit and adapted to laterally shift the crop along the floor; and means associated with the discharge of the transverse auger means for moving the crop rearwardly from the transverse auger means through the forage harvester inlet.

15. The invention defined in claim 14 wherein the means for moving the crop rearwardly from the transverse auger means comprises a fore-and-aft auger mounted on the header frame above the floor.

16. The invention defined in claim 14 and including a crop compressor means mounted on the header frame and extending forwardly therefrom above the pickup unit, said compressor means including a generally horizontal frame extending forwardly from the header frame, a plurality of curved compressor fingers disposed above and extending rearwardly toward the transverse auger above the pickup rotor, and transverse pivot means operatively associated with the header frame to allow the compressor fingers to swing upwardly and rearwardly away from the pickup unit.

* * * * *